US009467029B2

United States Patent
Ponzio et al.

(10) Patent No.: US 9,467,029 B2
(45) Date of Patent: Oct. 11, 2016

(54) APPARATUS AND METHOD FOR WINDING SUPPORTS FOR COILS AND SINGLE POLES OF CORES FOR DYNAMOELECTRIC MACHINES

(75) Inventors: Massimo Ponzio, Florence (IT); Maurizio Mugelli, Siena (IT); Rubino Corbinelli, Siena (IT)

(73) Assignee: ATOP S.p.A., Barberino Val d'Elsa, Florence (IT)

( * ) Notice: Subject to any disclaimer, the term of this patent is extended or adjusted under 35 U.S.C. 154(b) by 469 days.

(21) Appl. No.: 13/388,219

(22) PCT Filed: Jun. 20, 2011

(86) PCT No.: PCT/EP2011/003043
§ 371 (c)(1),
(2), (4) Date: Jan. 31, 2012

(87) PCT Pub. No.: WO2011/160806
PCT Pub. Date: Dec. 29, 2011

(65) Prior Publication Data
US 2012/0124822 A1    May 24, 2012

(30) Foreign Application Priority Data

Jun. 21, 2010 (IT) ................ PI2010A0074
Jun. 21, 2010 (IT) ................ PI2010A0075
Jun. 21, 2010 (IT) ................ PI2010A0076

(51) Int. Cl.
*H02K 15/095* (2006.01)
*H02K 15/04* (2006.01)
*H01F 41/06* (2016.01)

(52) U.S. Cl.
CPC .......... *H02K 15/095* (2013.01); *H01F 41/066* (2016.01); *H02K 15/045* (2013.01); *H01F 41/09* (2016.01); *H01F 41/094* (2016.01); *H01F 41/096* (2016.01); *Y10T 29/49009* (2015.01)

(58) Field of Classification Search
CPC ........... H01F 41/0633; H01F 41/0641; H01F 41/0654; H01F 41/063; H01F 41/066; Y10T 29/49071; H02K 15/045; H02K 15/095
See application file for complete search history.

(56) References Cited

U.S. PATENT DOCUMENTS 3,621,190 A * 11/1971 Kazumasa Morikawa et al. ............................ 219/155

(Continued)

FOREIGN PATENT DOCUMENTS

| EP | 1 592 111 | 11/2005 |
|---|---|---|
| GB | 1076001 | 7/1967 |
| JP | 7-183152 | 7/1995 |
| JP | 7-194075 | 7/1995 |

(Continued)

*Primary Examiner* — Livius R Cazan
(74) *Attorney, Agent, or Firm* — Ropes & Gray LLP

(57) ABSTRACT

Apparatus and method for winding coils of at least one electric wire conductor (W) on a coil support (10, 11, 10', 11') comprising a coil support (10,11) wound and assembled on a pole of a core of a dynamo electric machine, or a pole (10',11') wound and assembled to form the core of a dynamo electric machine; comprising: a wire dispenser (19), the wire dispenser having a passage portion (18) for the wire and an exit (23') from where the wire reaches the coil support (10, 11, 10', 11') during winding; means (31,32) for pressing on the wire (W) during winding to bend the wire according to a configuration of the coil; means (20) for supporting and rotating the coil support with respect to the dispenser (19) to wind the wire on the coil support (10,11, 10', 11'); means (40) for applying tension on the wire reaching the dispenser (19); means (24, 24', 25, 25', 26, 26') for moving the dispenser (19) with respect to the coil support (10, 11, 10', 11').

13 Claims, 7 Drawing Sheets

(56) References Cited

U.S. PATENT DOCUMENTS

| | | | |
|---|---|---|---|
| 4,150,801 A * | 4/1979 | Ikegami et al. | 242/478.1 |
| 4,421,284 A * | 12/1983 | Pan | B65H 54/2851 |
| | | | 174/DIG. 13 |
| 5,268,551 A * | 12/1993 | Kawanabe et al. | 219/69.12 |
| 6,341,744 B1 * | 1/2002 | Sugiuchi | B65H 54/2803 |
| | | | 242/447.2 |
| 6,400,059 B1 | 6/2002 | Hsu | |
| 6,553,650 B2 | 4/2003 | Nakamura et al. | |
| 2010/0325875 A1 | 12/2010 | Ponzio | |
| 2011/0114781 A1 | 5/2011 | Kimura et al. | |

FOREIGN PATENT DOCUMENTS

| | | |
|---|---|---|
| JP | 9-182390 | 7/1997 |
| JP | 11-312621 | 11/1999 |
| JP | 11-332185 | 11/1999 |
| JP | 2000-116076 | 4/2000 |
| JP | 2000-333420 | 11/2000 |
| JP | 2001-86711 | 3/2001 |
| JP | 2002-057056 | 2/2002 |
| JP | 2003-009444 | 1/2003 |
| JP | 2004-328844 | 11/2004 |
| WO | WO 2009/115312 | 9/2009 |

* cited by examiner

APPARATUS AND METHOD FOR WINDING SUPPORTS FOR COILS AND SINGLE POLES OF CORES FOR DYNAMOELECTRIC MACHINES

FIELD OF THE INVENTION

The present invention relates to winding of coils of dynamoelectric machines. In particular the invention relates to winding supports for coils or single poles in which one or more electric conductors (in the following referred to as wires) are wound to form a coil of a predetermined number of turns.

BACKGROUND OF THE INVENTION

The supports for coils are made of insulating material and become assembled on the poles of the cores after having being wound. Supports of this type have been described in WO 2009/115312.

Single poles are individual portions of the laminated core that are disassembled to be wound. After winding, the single poles are assembled together, one next to the other to form the laminated core, see for example EP 1098425.

In the following, the use of the terminology "coil support" can contemplate both the supports for coils and the single poles.

The wire that needs to wound may have a large cross section, therefore when bending occurs the wire becomes permanently deformed.

During winding, the wire is bent to be in contact with the surface of the coil support, or to be in contact with portions of wire that have been previously wound on the coil support.

The deformation process bends the wire according to a configuration that tries to copy the shape of the perimeter of the coil support where the turns need to be wound. In this way, the quantity of wire that needs to be wound in a given space of the coil support becomes maximized.

Winding can occur by rotating the coil support to extract wire from the exit of a wire dispenser and by directing the wire from the wire dispenser to required positions of the coil support.

In these positions of the coil support the wire is deformed against the surface of the coil support, or against turns that have been previously deposited, like is described in WO 2009/115312.

Modern applications of dynamoelectric machines require that the length of wire that is wound on the coil support should be very long and precisely matching a predetermined total quantity.

Furthermore, in achieving this maximum filling, the winding operations and formation of the initial and final leads of the coils should be performed automatically without damaging the wire insulation. The presence of the damages can be responsible for an early deterioration of the dynamoelectric machine.

SUMMARY OF THE INVENTION

It is therefore an object of the present invention to position lengths of wire with precision in predetermined positions of the coil support during winding to form a coil.

It is a further object of the present invention to guarantee that the wire wound on the coil support results deformed with precision in order to be positioned along predetermined trajectories of the coil support to increase the wire filling.

It is also an object of the present invention to automatically accomplish the winding operations and form the initial and final leads of the coils and the stretches of wire for passage between the coils.

Another object of the present invention is to position lengths of wire having desired tension in predetermined positions of the coil support during winding to form a coil.

A further object of the invention of the present invention is to guarantee that the wire wound on the coil support results tensioned with precision in order to be positioned along predetermined trajectories of the coil support to increase the wire filling.

It is also an object of the present invention to accomplish with required tension the winding operations and form the initial and final leads of the coils and the stretches of wire for passage between the coils.

These and other objects are accomplished with the apparatuses and methods of the invention according to the independent claims.

Further characteristics of the invention are defined in the dependent claims.

BRIEF DESCRIPTION OF THE DRAWINGS

Further characteristics and advantages of the apparatus and the methods according to the invention will result more clearer from the description which follows of FIG. 1 is a prospective view of two coil supports that have been wound using the principles of the invention;

FIG. 5a is a partial prospective view as seen from direction 5a of FIG. 5;

DESCRIPTION OF THE PREFERRED EMBODIMENTS

Figure 1:
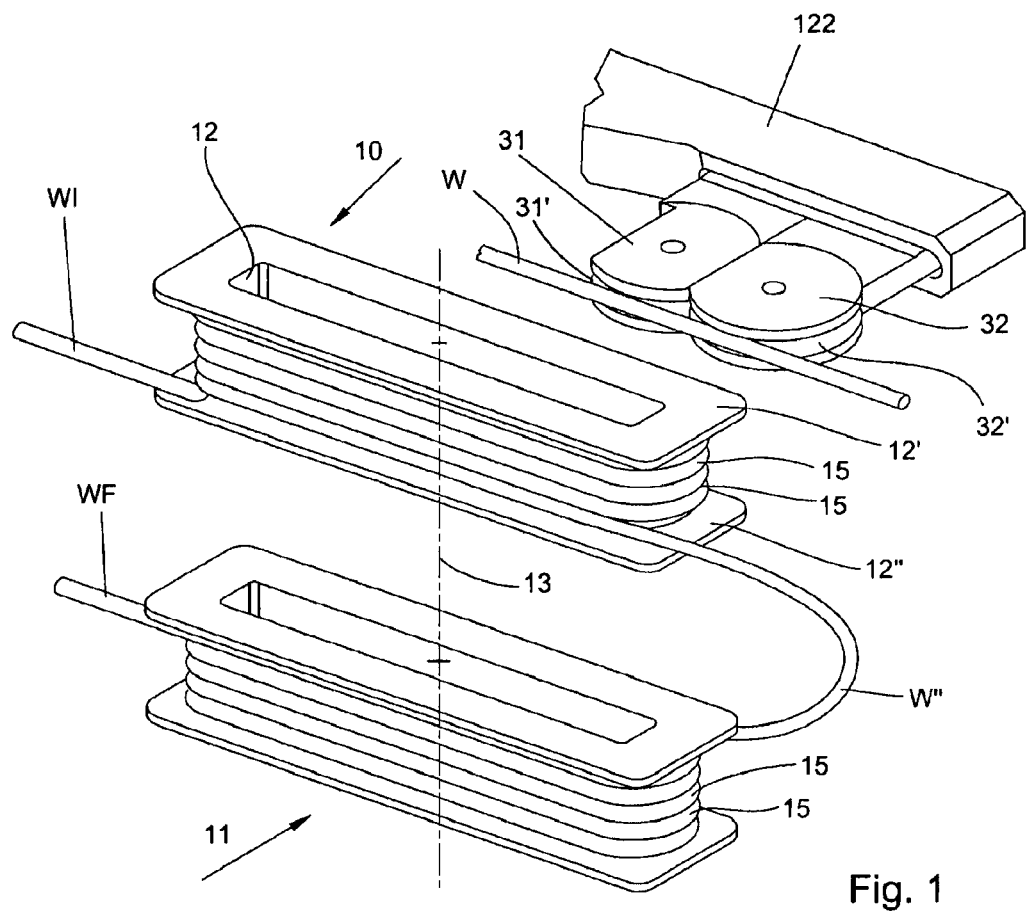
FIG. 1a is a prospective view showing two single poles that have been wound using the principles of the invention.

With reference to FIG. 1 the coils supports 10 that need to be wound are provided with a central portion 12 and opposite flange portions 12' and 12". The wire W is wound around the central portion 12 for a certain number of turns 15 until flanges 12' and 12" are engaged by the turns as shown.

Two coils supports 10 and 11 can be electrically connected by the same wire W''' like is shown in FIG. 1. As a sequence, first coil support 10 is wound, and successively coil support 11 is wound. In the passage of operations between winding coil support 10 and winding coil support 11 continuous wire W''' is formed, i.e. a stretch W''' is formed without interrupting wire W used for winding.

The initial stretch of wire W that enters the coil of coil support 10 is referenced WI, whilst the final stretch of wire that exits coil support 11 is referenced WF.

Figure 1A:
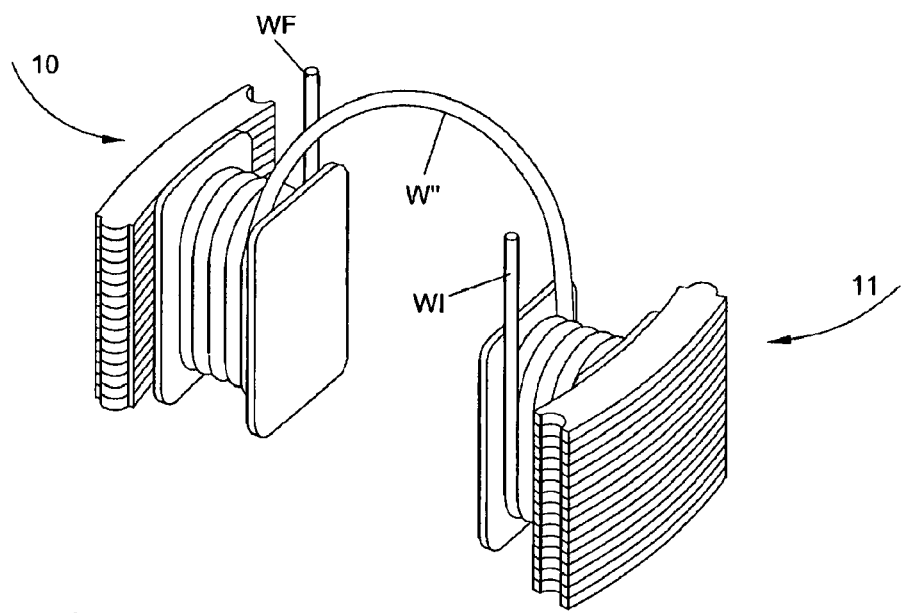

In FIG. 1a, two single poles 10', 11' have the coils wound with wire W and result connected by means of stretch W''. Similarly to the coil supports of FIG. 1, the initial and final leads are respectively referenced WI and WF.

Figure 2:
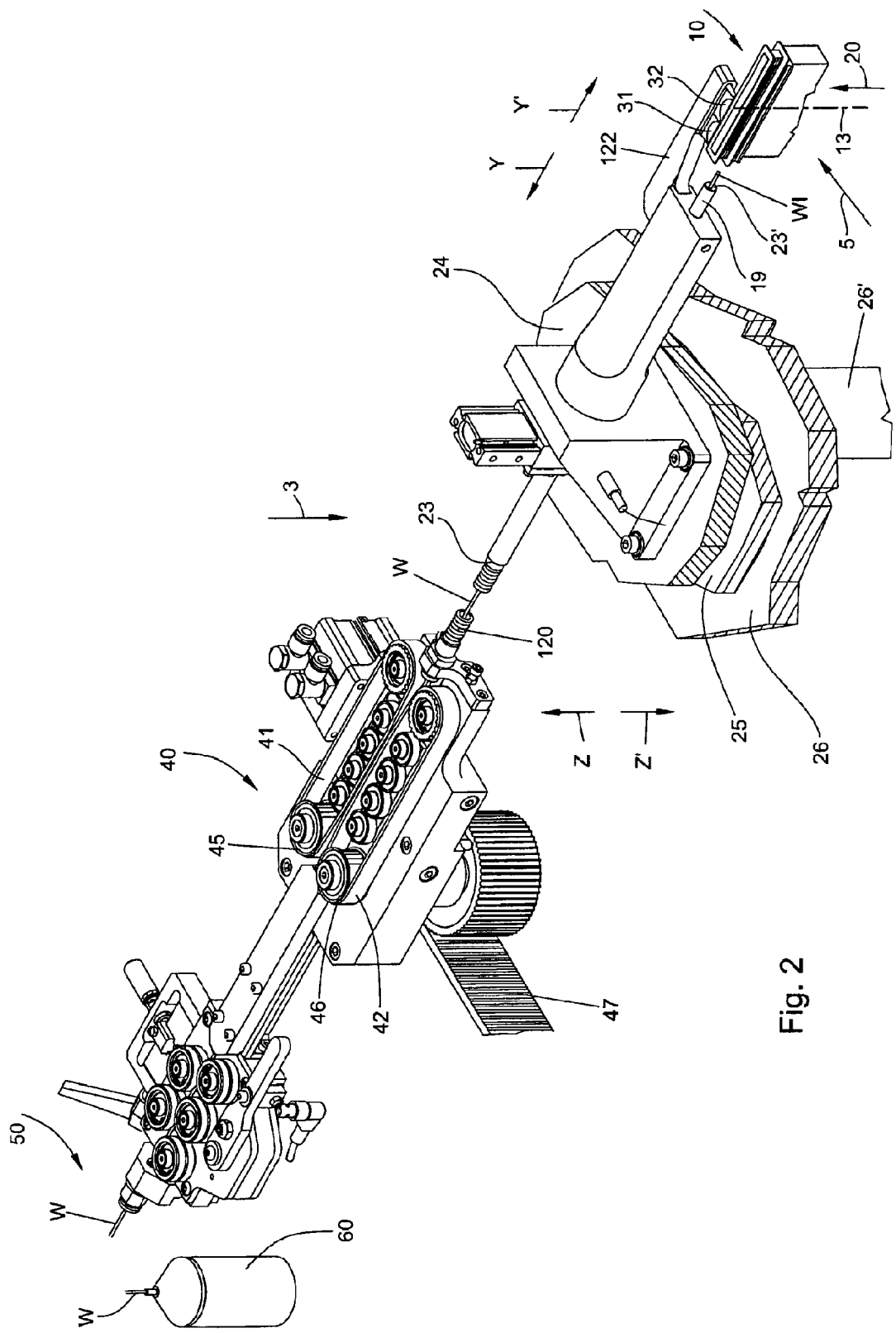
FIG. 2 is a prospective view of an embodiment of an apparatus of the invention for winding the coil supports of FIG. 1.

With reference to FIG. 2, at least one wire W is delivered by wire delivery member 19. More particularly, wire W runs through guide passage 18 (see FIG. 4) which leads to wire delivery member 19. The wire W enters wire delivery member 19 through end, or enter, 23, after having passed through spring 120, and leaves the wire delivery member 19 from exit 23' (see FIG. 3).

Figure 3:
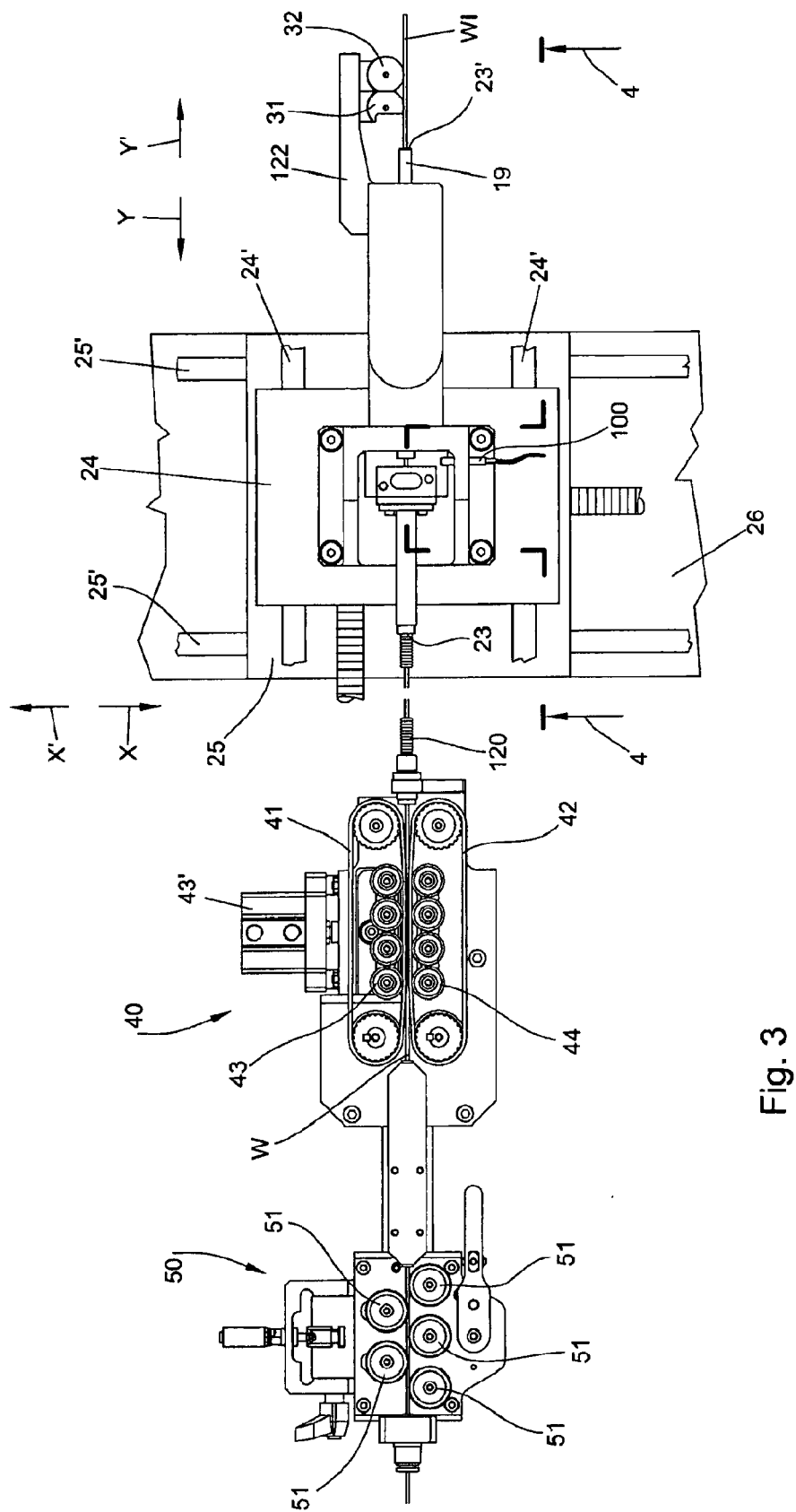
FIG. 3 is a partial view as seen from direction 3 of FIG. 2.

With reference to FIGS. 2 and 3, the wire delivery member 19 is assembled on platform 24, which can move when required in directions Y and Y' by running on guides 24'. Guides 24' are assembled on platform 25 which can move in directions X and X' by running on guides 25'. Guides 25' can be part of a further platform 26 which moves when required in directions Z and Z' by movement of shaft 26' of the apparatus (see FIG. 3).

Each of the platforms 24,25,26 are moved by means of a respective motor screw system. Each motor of a respective motor screw mechanism can be controlled by an axis control system. Therefore, wire delivery member 19 can be moved in space in the directions Z,Z',Y,Y',X,X' to reach programmed positions in required times.

Device 40, which is fixed to the frame of the apparatus, is located upstream with respect to entrance 23. Device 40 is capable of feeding wire W in directions Y and Y', i.e. respectively feeding wire towards delivery member 19, or withdrawing wire from delivery member 19.

Furthermore, device 40 is capable of applying a braking action on the wire when it runs in directions Y' and Y. Device 40 is capable of accomplishing these actions in a programmable manner, as a function of the stage and winding instances.

In particular, device 40 accomplishes actions of feeding, withdrawing or braking the wire as a function of the position of the delivery member 19 and the position of pressure member 32 (described in the following).

Device 40 comprises two belt members 41 and 42 facing each other for a certain length portion, as shown in FIGS. 2 and 3. The wire W is positioned in the space existing between the portions of the belts that are facing each other, as shown in FIGS. 2 and 3. The group of rollers 43 push on belts 41, whilst the group of rollers 44 react to the pressure created on belt 42. In this way, wire W is gripped between the length portions of the belts facing each other, as shown in FIGS. 2 and 3, with a force that depends on the pressure achieved by the group of rollers 43 pushed by the linear actuator 43'.

The motor (not shown) that drives belt 47 (see FIG. 2) is programmed and controlled to rotate pulley wheels 45 and 46 where belts 41 and 42 are engaged to be moved.

By controlling the motor that drives belt 47, belts 41 and 42 can run in synchronism with each other in direction Y, or in opposite direction Y'.

When the belts run in direction Y', the wire is fed towards entrance 23, whilst when the belts run in the opposite direction Y the wire is withdrawn from entrance 23. The result is respectively to feed the wire from delivery member 19 towards the coil support being wound, or to withdraw the wire in passage 18 of delivery member 19.

Furthermore, the pressure applied on wire W by means of rollers 43 avoids that belts 41 and 42 slip on the wire when it is moving in directions Y and Y'.

At the same time, a predetermined braking torque can be applied by the motor of belt 47 to produce on behalf of belts 41, 42 an opposite force (tension), in other words a drag on the wire, as the latter runs towards the delivery member 19 due to the pull occurring during winding in the feed direction Y' by the rotation R of the coil support like 10.

In this situation a tension is created on the wire, which influences the positioning and bending of the turns. To optimize this result on the turns it is preferable to apply a tension generated by the motor of belt 47 as a function of the position of the delivery member 19 and the position of the pressure member 32.

The ideal tension law to be applied on the wire needs to determined and programmed as a function of the characteristics of the wire, of the coil support or the single pole which needs to be wound.

Assembly 50 is provided with a series of idle rollers 51 (see FIGS. 2 and 3), in between which wire W runs as it advances towards device 40.

Assembly 50 is required for straightening wire W after wire W has been extracted from the wire store 60.

In fact, in assembly 50 the wire runs in grooves existing on the circumference of the idle rollers 51. The grooves are aligned on the rectilinear path where the wire needs to travel to reach device 40.

Figure 4:
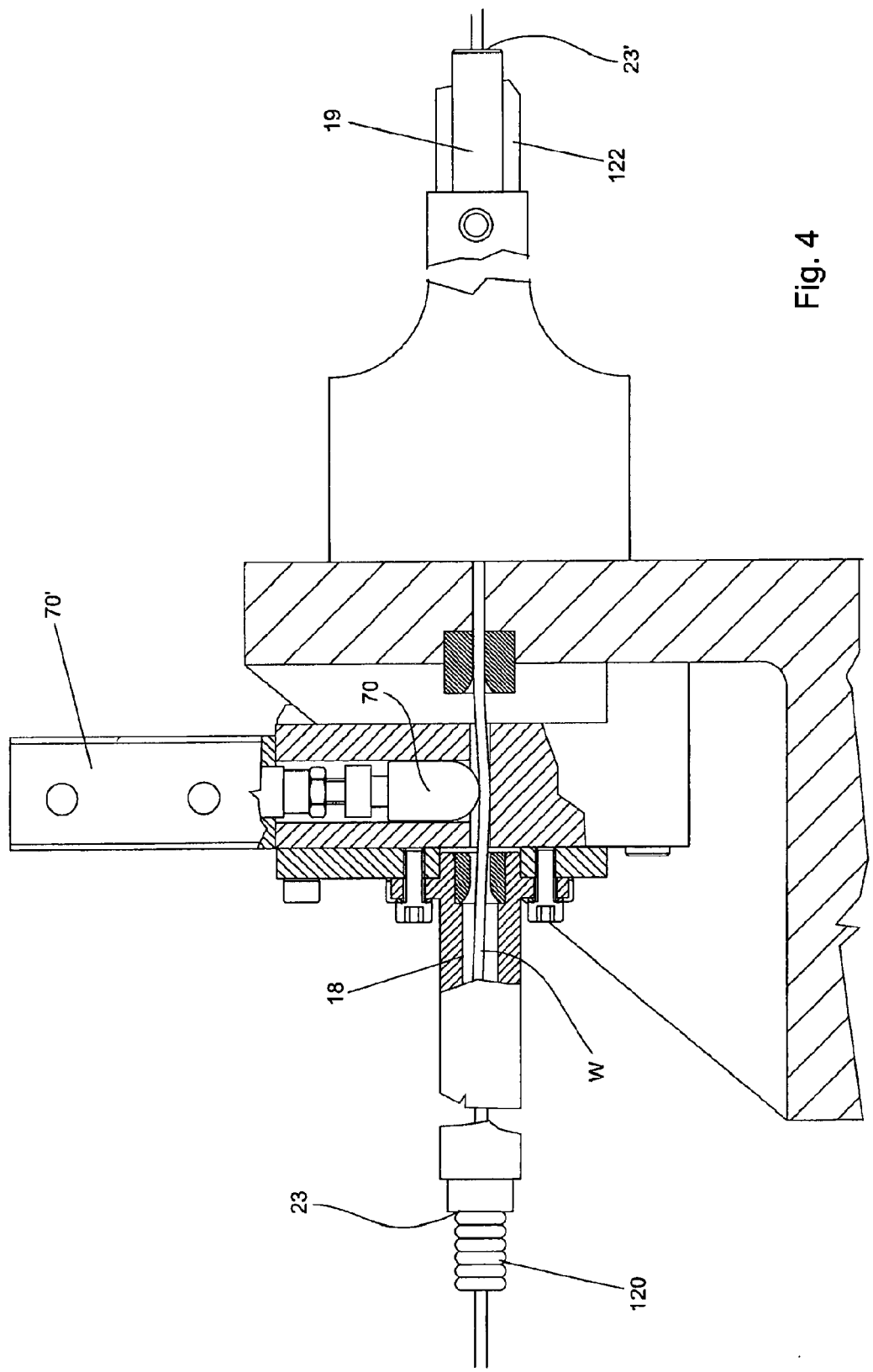
FIG. 4 is a partial section view as seen from direction 4-4 of FIG. 3.

A wire presser 70 is present within passage 18 (see particularly FIG. 4). Passage 18 extends from entrance 23 to exit 23' of delivery member 19. Wire presser 70 is pushed by linear actuator 70'. Wire presser 70 is capable of pressing on wire W for blocking wire W in passage 18 against possible running in directions Y and Y', like is shown in FIG. 4.

A spring 120 is assembled at the exit of assembly 40 and at the entrance 23 as shown in FIGS. 2, 3 and 4. Wire W runs within the interior of spring 120. Spring 120 functions as a guiding corridor for wire W when wire W is running towards delivery member 19.

Spring 120 can extend axially and laterally when entrance 23 moves in directions X,X',Y,Y',Z,Z' due to the movements of platforms 24, 25 and 26.

Spring 120 has an important function when a new wire needs to be fed to delivery member 19, i.e. when a cut end of a new wire needs to pass automatically through assembly 40 and enter entrance 23. In this situation, the platforms 24, 25 and 26 are moved for positioning spring 120 in alignment with assembly 40, see FIG. 2. Furthermore, and as a result of this positioning, spring 120 is totally compressed to have all of its turns in contact to create a corridor that is closed laterally for guiding the end of the new wire when it runs towards entrance 23.

In this situation, assembly 40 is feeding the new wire until its end is individuated by sensor 100 (see FIG. 3). Starting from this individuation calculated feeding of wire W occurs on behalf of the motor of belt 47 to achieve that a predetermined length of wire WI extends from exit 23' of delivery member 19.

In summary, assembly 40 can feed a predetermined length of wire WI to have it extend from exit 23' of delivery member 19. The portion WI, which extends from exit 23', can be a portion which needs to be inserted in a clamping device 52 (see FIGS. 5 and 5a) to start winding the coil support 10.

A stretch of this portion of wire extending from delivery member 19 becomes positioned in groove 32' of pressure member 32 and in a groove 31' of member 31 (see FIGS. 1 and 3).

In fact, pressure member 32 and member 31 are assembled on arm 122, which in turn is mounted integral to delivery member 19, as shown in FIGS. 2 and 3.

This assembly is such that alignment with exit 23' occurs of channel 32' of pressure member 32 and of channel of member 31.

Therefore, by feeding wire W from delivery member 19 a stretch of the portion of wire, which extends from exit 23' becomes positioned in channel 32' of pressure member 32 and in the channel of member 31, as shown in FIGS. 1-3.

The purpose of pressure member 32 and member 31 is to bend the wire on the coil support 10 during winding, like has been described in application WO 2009/115312. The presence of pressure member 31 is not always necessary and depends on the characteristics of the wire and the coil support or single pole that are wound.

Figure 5:
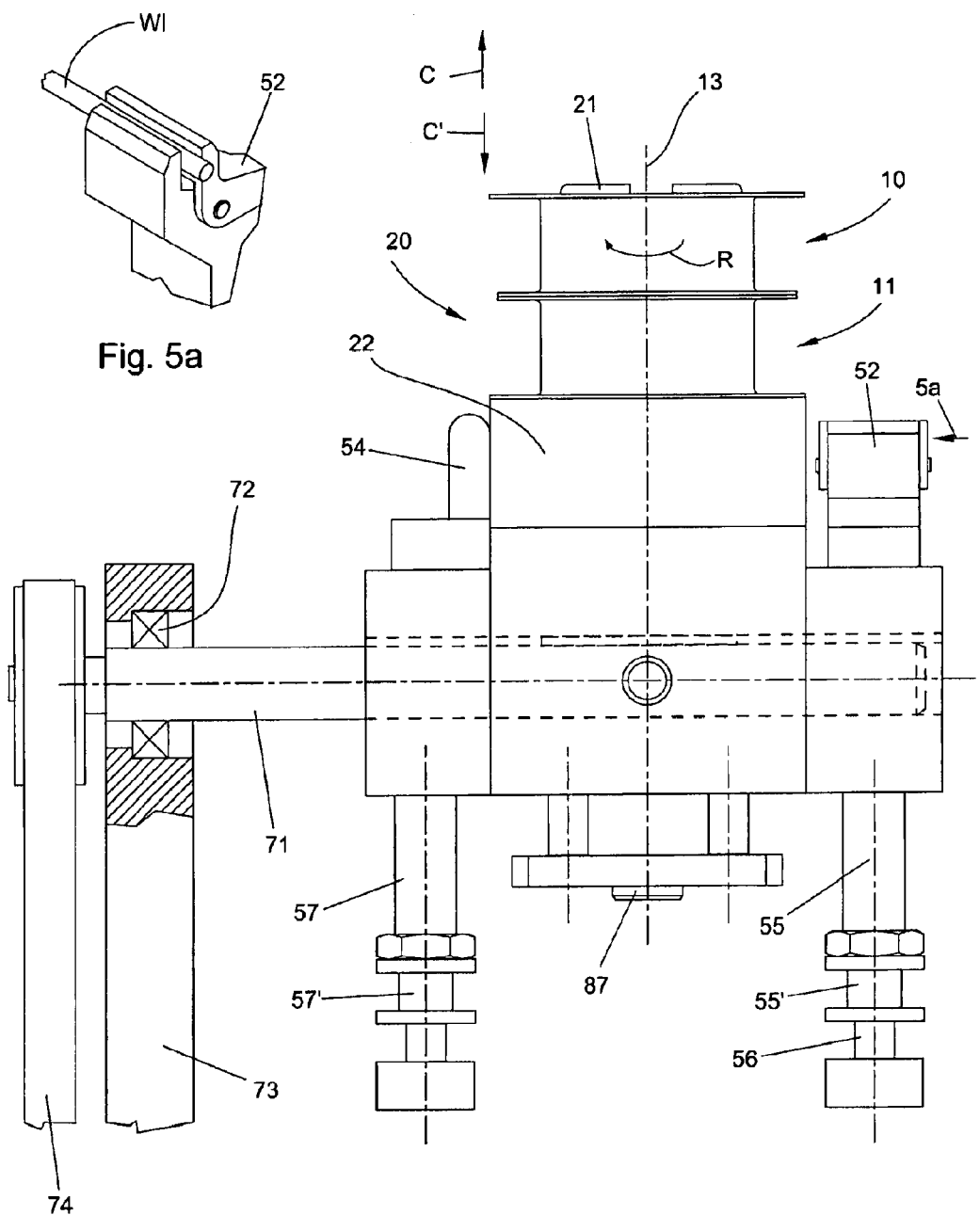
FIG. 5 is a partial view as seen from direction 5 of FIG. 2.
Figure 6:
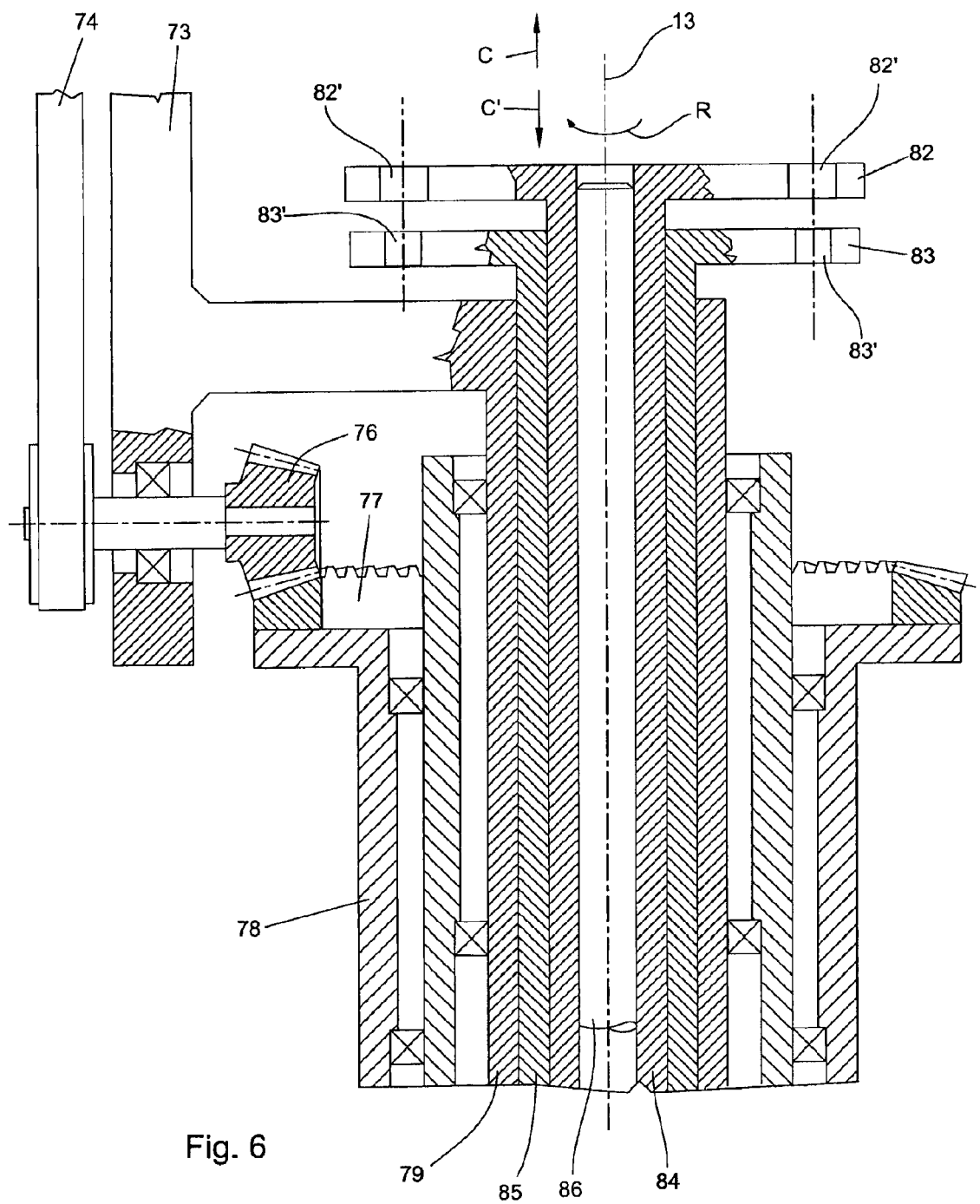
FIG. 6 is a continuation of the inferior part of of FIG. 5.

With reference to FIGS. 5, 5a and 6, a gripper assembly 20 grips and rotates the coil supports 10, 11 with rotation R around axis 13 to achieve winding. Although not shown, assembly 20 with certain modifications can grip and rotate the single poles shown in FIG. 1a.

In the embodiments of FIGS. 5 and 6 the two coil supports 10 and 11 are grasped inside the central part 12 so that the coil supports result adjacent and aligned on axis 13, as shown in FIG. 5. In this respect, assembly 20 comprises an expandable gripper member 21, which becomes inserted in the hollow portion of coil supports 10 and 11. A mechanism with an inclined plane of know type is present support body 22 for expanding and closing the grasping member 21.

The rotation of the support body 22 around axis 13 presents wire W exiting delivery member 19 in alignment with positions of the coils support 10 and 11 where wire W becomes bent by members 32 and 31 to form the turns of the coils.

Clamp 52 and deflector 54 are assembled on body 22 to move in directions C and C' parallel to axis 13 as shown in FIGS. 5 and 7a-7e.

Tube 55 supports clamp 52 and is capable of running on body 22 in directions C and C' for achieving movement of clamp 52 in directions C and C', as shown in the sequences of FIGS. 7a-7e.

Shaft 56 within tube 55, if made to move in directions C and C', opens and closes clamp 52 when it is necessary to clamp or release stretch of wire WI.

Tube 57 supports deflector 54 and is capable of moving on body 22 in directions C and C' to obtain that deflector 54 moves in directions C and C', as shown in the sequences of FIGS. 7a-7e.

Body 22 receives shaft 71 (see FIG. 5) in a manner that is easily dismountable to facilitate the substitution of assembly 20 for processing coil supports of different dimensions, or if necessary to use other clamps like 52 or deflectors like 54 that are configured differently.

Shaft 71 is mounted on arm 73 to rotate support body 22 with rotation R around axis 13.

More precisely, shaft 71 is assembled on bearing assembly 72, which in turn is assembled on arm 73.

Arm 73 is integral to tube 79 (see FIG. 6) which becomes rotated around axis 13 by a motor (not shown) for achieving rotation R of body 22 around axis 13 for winding.

Shaft 71 can be rotated by belt 74, which is rotated by pinion 76 which engages crown 77 of tube 78. Tube 78 is rotated around axis 13 by a motor (not shown) for achieving rotation of the clamp assembly 20 around an axis that is perpendicular to axis 13, in order to bring body 22 with the coil supports out of the plane of FIG. 5. The rotation can be necessary when the wire passes from one turn to another on the coil support. In this passage, which normally occurs on the short side of the coil support, the wire is wound on an inclined path due to the fact that the rotation axis 13 is out of the plane of FIG. 5.

Plates 82 and 83 are integral to ends respectively of tubes 84 and 85. Tubes 84 and 85 are assembled coaxial to axis 13 and are capable of moving in directions C and C' in specific moments of the operational sequences of the winding apparatus, as shown in the following with reference to FIGS. 7a-7e.

Shaft 86 is assembled to move within tube 85 in directions C and C' when required. When shaft 86 moves in direction C it engages member 87 (see FIG. 5) of the inclined plane mechanism present within support body 22.

A movement of member 87 in direction C, following the engagement and pushing of shaft 86 causes a contraction of member 21, which releases gripping on coil supports 10 and 11. The movement of member 87 in direction C' to grip the coils supports 10 and 11 is caused by the simultaneous detachment of shaft 86 and by the action of a recall spring belonging to the inclined mechanism present in body 22.

By rotating body 22 and moving tube 84 in direction C it is possible to align and engage the ends 55' and 57', respectively of tube 56 and tube 57, with the slots 82' of plate 82. In this situation movement of tube 84 in directions C and C' accomplishes motion of gripper 52 or deflector 64 in directions C and C', as is required in the sequence of FIGS. 7a-7e.

Similarly, it is possible to engage the end of shaft 56 in slots 83' of plate 83, and by moving tube 85 in directions C and C' it is possible to open and close clamp 52, as is required in the sequence of FIGS. 7a-7e.

With reference to the sequence of operations illustrated in FIGS. 7a-7e, FIG. 7a shows a portion of wire WI extending from delivery member 19 and located in groove 32' of pressure member 32 and in the groove of member 31. Such a portion of wire has been produced by actuating belts 41 and 42 to turn towards direction Y' and therefore feed wire through passage 18 up to the beam of sensor 100. The interception with the beam initiates a calculated feed on behalf of the motor of belt 47 that drives belts 41 and 42. The calculated feed occurs by position controlling the motor of belt 47 to guarantee that the portion of wire that passes sensor 100 achieves stretch WI which extends from delivery member 19 for a predetermined length. When the predetermined length is reached, presser 70 is actuated to block the wire portion WI (see FIG. 4). This is necessary during the movements that follow of delivery member 19, for example during the movement in direction Y' for becoming near to the coil support (see FIGS. 7a-7b) and for being with portion WI in alignment with gripper 52.

Blocking the wire W with presser 70 during the movements of delivery member 19 achieves that the length of stretch WI does not change, but at the same time accomplishes recalling variable lengths of wire, which extend from entrance 23 to the exit of assembly 40 and which that run within extendible spring 120.

Figure 7A:
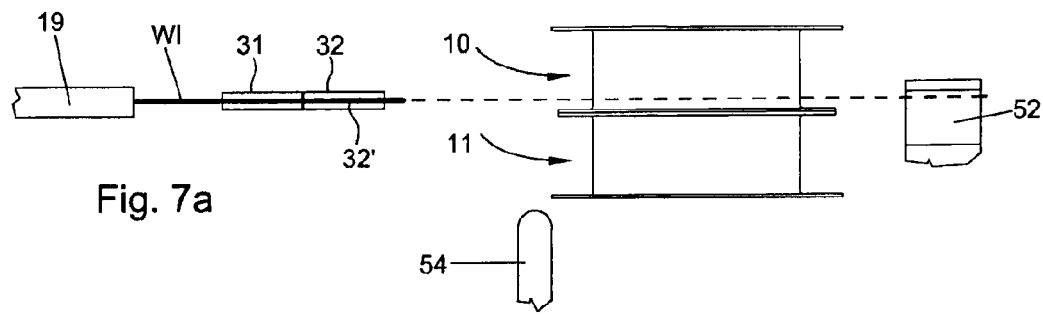
FIGS. 7a-7e are schematic partial views according to direction 5 of FIG. 2 showing a sequence of winding conditions and lead formation of the coils accomplished with the solutions of the invention.
Figure 7B:
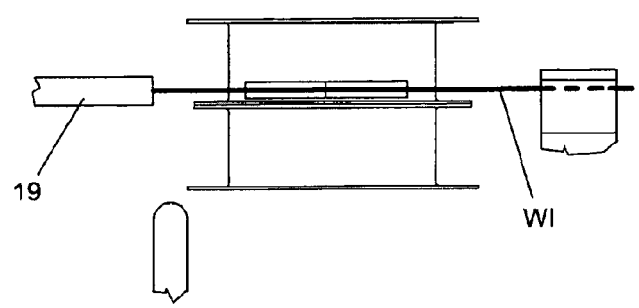
Figure 7C:
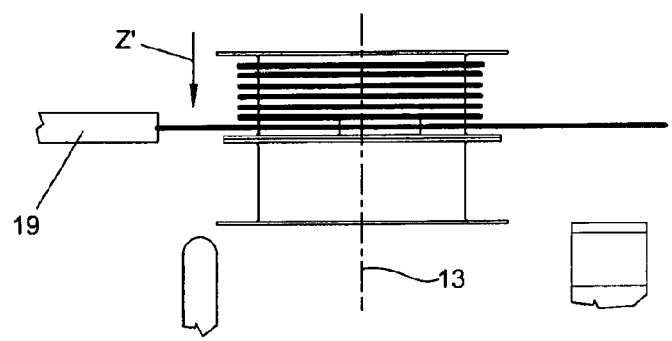

In the positions of being near to the coil support 10, as shown in FIGS. 7a and 7b, the presser is released and belts 41 and 42 feed a further length of wire in the direction Y'. This further length of wire is in alignment with pressure members 32 and 31. At the end of the feed, the wire reaches gripper 52 where it is clamped (see condition represented with the dash line in FIG. 7b and with full line in FIG. 5a) by moving shaft 56.

Following the situation of the wire being present and clamped in gripper 52, gripper assembly 20 can start rotation R around axis 13 to pull wire through delivery member 19 and thereby form the first coil around coil support 10. During the rotation around axis 13, delivery member 19 moves in direction Z' (parallel to direction C') to stratify the turns (see FIG. 7C)

Figure 7D:
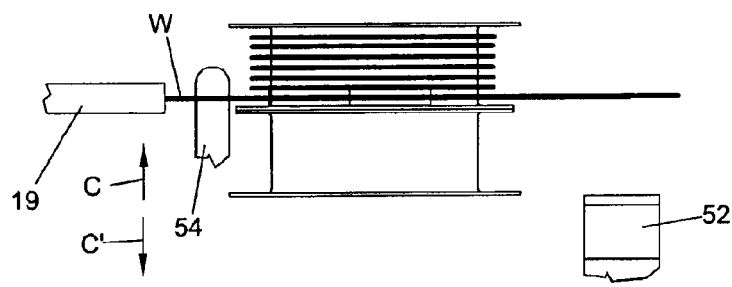
Figure 7E:
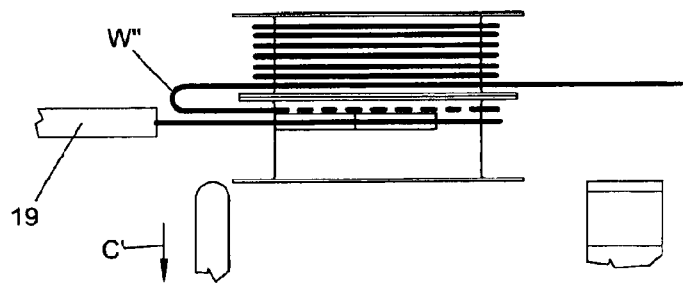

FIG. 7*d* shows the start of the sequence for passage of the wire from the coil of coil support 10 to the coil of coil support 11. Clamp 52 in the meantime is moved in direction C' (by moving shaft 55) to avoid interference with the stretch of wire that is being wound, whilst deflector 54 has been moved in direction C to be aligned with wire W that extends to delivery member 19. Successively, further rotation around axis 13 continues to wind wire W around deflector 54 and forms passage stretch W" which is outside of coil supports 10 and 11 (see FIG. 7*e*). Once the stretch W" has been formed, deflector 54 is moved in direction C' to be removed from the passage stretch W" (condition of FIG. 7*e*) and for avoiding interference during winding of the successive turns.

Once the required number of turns have been wound on coil support 11, wire W is cut by a cutter to leave a final stretch WF of the coil. The stretch of wire that has been cut and that extends from delivery member 19 can be of undefined length. This stretch of wire can be withdrawn through passage 18 until its cut end intercepts the beam of sensor 100. In this situation the calculated feeding in direction Y' can then be accomplished on behalf of the motor that drives belts 41 and 42 to guarantee that a portion of wire passing the beam of sensor 100 in direction Y' achieves the stretch WI extending from exit 23' for a predetermined length.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Apparatus for winding coils of at least one electric wire conductor on a coil support of a dynamo electric machine, the apparatus comprising:
a wire dispenser, the wire dispenser having a passage portion for the wire, an exit from where the wire reaches the coil support during winding, and a wire presser;
a pressure member for pressing on the wire during winding to bend the wire according to a configuration of the coil;
an assembly for supporting and rotating the coil support with respect to the dispenser to wind the wire on the coil support;
a tensioner device for applying tension on the wire reaching the dispenser; and
platforms for moving the dispenser with respect to the coil support;
wherein the dispenser is configured to position a predetermined length of wire such that, prior to winding, the predetermined length of wire extends from the exit of the dispenser to an unattached cut end in a direction for feeding the wire to the coil support and the pressure member is in alignment with the predetermined length of wire during movement of the dispenser prior to winding; and wherein the wire presser is configured to block the predetermined length of wire during the movement of the dispenser such that the length of the predetermined length of wire does not change.

2. The apparatus of claim 1 wherein the tensioner device is configured to feed further wire to position the unattached cut end of the predetermined length of wire in a wire holder that is integral with the assembly.

3. The apparatus of claim 1 comprising a deflector for creating a wire passage stretch between two coils of two coil supports that are positioned adjacently on the assembly; the deflector being integral with the assembly; and the deflector being movable to be in alignment with the dispenser to create the wire passage stretch.

4. The apparatus of claim 1 comprising a sensor for individuating the unattached cut end of the predetermined length of wire.

5. The apparatus of claim 1 wherein the tensioner device is configured to withdraw the wire from the dispenser up to a predetermined position from the exit after cutting the wire at the end of winding.

6. The apparatus of claim 1 comprising a spring for passage of the wire between the tensioner device and an entrance of the dispenser.

7. The apparatus of claim 1 wherein the pressure member and the predetermined length of wire are aligned during movement of the dispenser along an axis defined by the predetermined length of wire.

8. Method for winding coils of at least one electric wire conductor on a coil support of a dynamo electric machine, the method comprising:
positioning a predetermined length of wire such that, prior to winding, the predetermined length of wire extends from an exit of a wire dispenser to an unattached cut end in a direction for feeding the wire to the coil support and a pressure member is in alignment with the predetermined length of wire during movement of the dispenser prior to winding;
blocking the predetermined length of wire during the movement of the dispenser such that the length of the predetermined length of wire does not change;
releasing the predetermined length of wire after it has been secured for winding;
dispensing the wire with the dispenser; the dispenser having a passage portion for the wire and an exit from where the wire reaches the coil support during winding;
rotating the coil support with respect to the dispenser to wind the wire on the coil support;
aligning the wire with the pressure member during winding to bend the wire according to a configuration of the coil;
applying tension on the wire reaching the dispenser; and
moving the dispenser with respect to the coil support.

9. The method of claim 8 further comprising a step of feeding further wire to position the unattached cut end of the predetermined length of wire in a wire holder that rotates integral with an assembly for supporting the coil support.

10. The method of claim 8 further comprising a step of aligning a deflector with the wire exiting the dispenser to create a wire passage stretch between two coils of two coil supports; and rotating the deflector integral with the two coil supports during winding.

11. The method of claim 8 further comprising a step of monitoring the passage of the unattached cut end of the predetermined length of wire.

12. The method of claim 8 further comprising a step of withdrawing the wire from the dispenser up to a predetermined position from the exit after cutting the wire at the end of winding.

13. The method of claim 8 wherein the pressure member and the predetermined length of wire are aligned during movement of the dispenser along an axis defined by the predetermined length of wire.

\* \* \* \* \*